June 30, 1936. J. BOWEN 2,046,105
CASTER CONTROL MECHANISM FOR MOVABLE TRUCKS AND THE LIKE
Filed Feb. 25, 1936 2 Sheets-Sheet 2
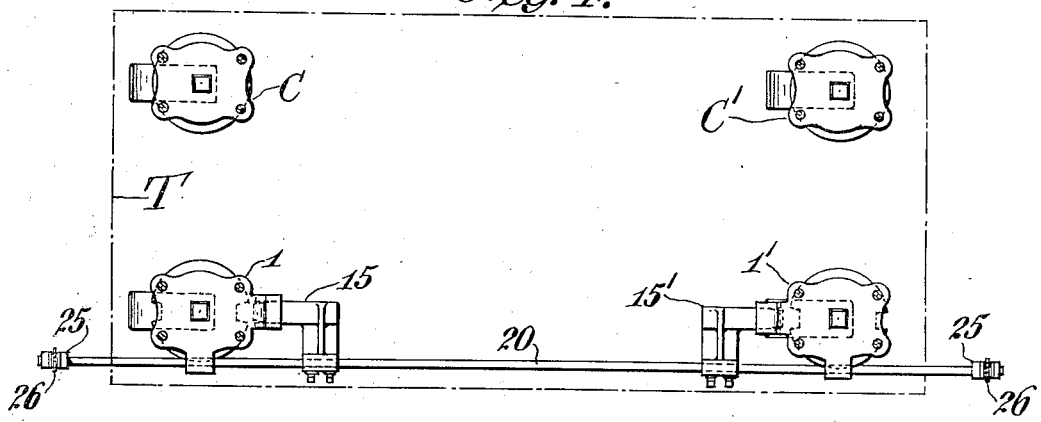
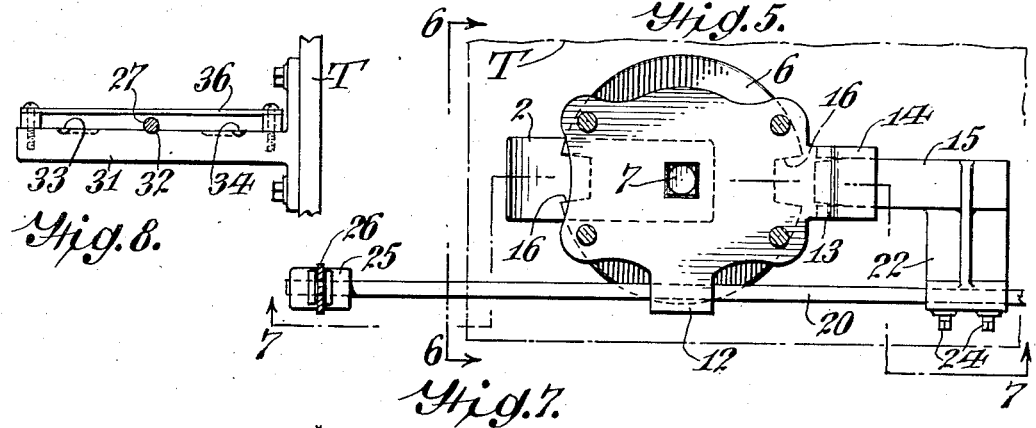
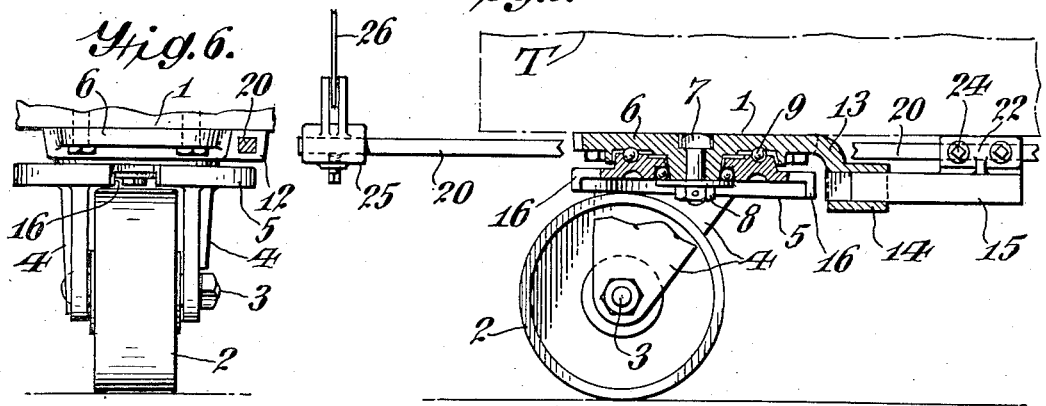
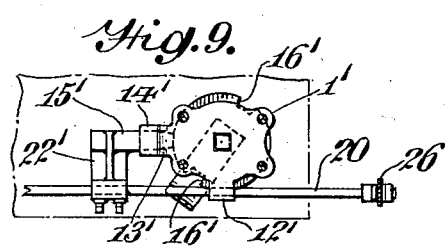
INVENTOR.
James Bowen,
BY
ATTORNEY.

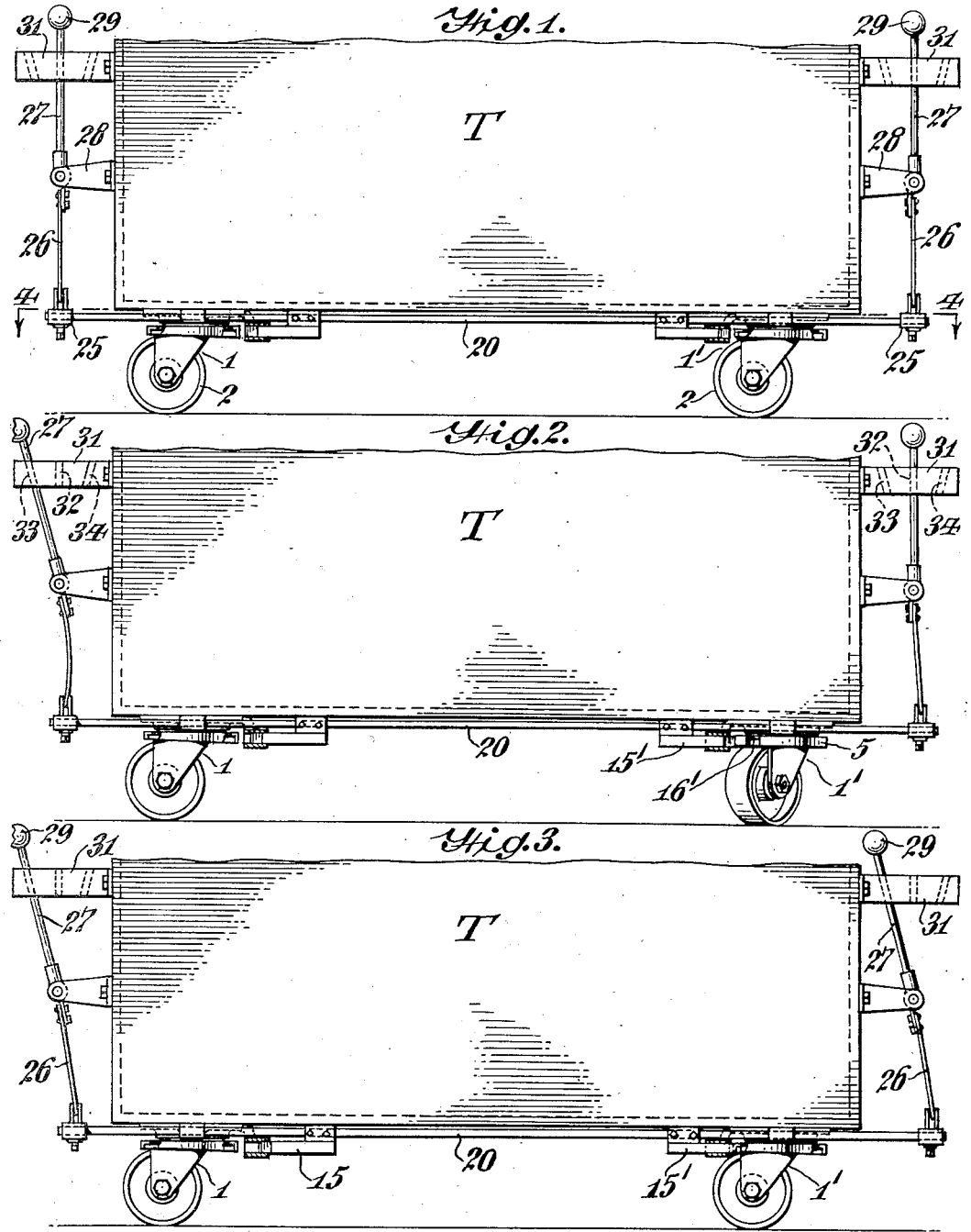

Patented June 30, 1936

2,046,105

UNITED STATES PATENT OFFICE 2,046,105

CASTER CONTROL MECHANISM FOR MOVABLE TRUCKS AND THE LIKE

James Bowen, Manheim, Pa., assignor to Charles Bond, Philadelphia, Pa.

Application February 25, 1936, Serial No. 65,631

13 Claims. (Cl. 280—49)

The present invention relates to movable trucks, racks and similar vehicles for transporting articles over short distances, such as about a shop or mill, and is more particularly directed to the provision of novel mechanism for controlling the casters with which such vehicles are customarily provided.

In order that trucks of this general character may be readily moved in any direction at the will of the operator while pushing or pulling them over the floor, they are usually equipped with swivel casters respectively located near the corners of the truck but when all the casters are free to swivel, proper guiding of the truck, especially in close quarters and/or when it is being pushed rather than pulled by the operator, is extremely difficult due to the failure of the casters to "track" in or properly adhere to the desired direction of travel.

Attempts have been made to remedy this condition by providing means for locking a plurality of the casters against swivelling, but I have found that if but a single caster at the leading end of the truck is locked so it can rotate only in a plane parallel to the side of the truck, the latter can be very easily and accurately guided from the opposite end, and the present invention is based on this discovery and thus directed to the provision of mechanism which by enabling one caster at either end of the truck to be readily locked against swivelling or unlocked at will, while all the other casters are left free to swivel in the normal manner, enhances the facility with which the truck may be guided while being moved about.

It is therefore a principal object of the invention to provide in a truck or similar vehicle having swivel casters, manually operable means for selectively locking either one of a longitudinally aligned pair of the casters against swivelling while simultaneously placing and/or maintaining the other casters in condition to swivel naturally.

A further object of the invention is to provide mechanism operable from either end of the truck to which it is applied by means of which the operator may selectively lock one of the swivel casters at either end thereof so that its wheel is constrained to rotate only in a plane parallel to the side of the truck, and thus in its generally desired direction of travel.

A still further object is the provision in caster locking mechanism of manually operable means which at any time and irrespective of the then position of the caster which it is desired to lock may be set in such manner as to automatically lock the selected caster upon its subsequently being brought, by movement of the truck or otherwise, into a position such that its wheel lies parallel to the side of the truck.

Another object of the invention is the provision in a truck embodying swivel casters of means manually operable from either end of the truck to selectively lock one of a longitudinally aligned pair of the casters against swivelling and to simultaneously unlock the other caster of said pair in case it has been previously similarly locked.

Additional objects comprehend the provision of locking mechanism capable of performing the aforesaid functions which is of relatively simple design and construction; which can be manipulated with facility by unskilled labor; which is not liable to get out of order or become damaged by rough usage and which can be readily installed on existing trucks or incorporated in new ones at a moderate cost.

Other objects, purposes and advantages of the invention will hereinafter more fully appear or will be understood from the following description of one form of my locking mechanism as illustrated in the accompanying drawings, in which Fig. 1 is a fragmentary side elevation of a truck equipped with the said mechanism showing the latter in intermediate or neutral position in which both casters of the pair controlled thereby are free to swivel in all directions.

Fig. 2 is a similar view showing the locking mechanism in condition to automatically lock one caster upon attainment thereby of a position parallel with the sides of the truck.

Fig. 3 is a similar view showing the same mechanism after the said caster has been brought into parallelism with the sides of the truck and locked against swivelling through the automatic operation of the locking mechanism.

Fig. 4 is a fragmentary horizontal section on the line 4—4 in Fig. 1.

Fig. 5 is an enlarged fragmentary detail of a portion of the mechanism shown in Fig. 4.

Fig. 6 is a fragmentary transverse vertical section on the line 6—6 in Fig. 5.

Fig. 7 is a fragmentary longitudinal vertical section on the line 7—7 in Fig. 5.

Fig. 8 is an enlarged fragmentary top plan view of the manual operating means and associated parts, and Fig. 9 is a fragmentary detail corresponding to Fig. 5 but on a reduced scale showing certain of the parts in positions corresponding to Fig. 2.

In the several figures like characters are used to designate the same parts.

More particularly, the truck T which may be of any desired character is equipped with four swivel casters respectively located adjacent its corners; two of these casters C, C' adjacent one side of the truck and which are always free to swivel, may be of any usual type, and therefore require no specific description.

The other casters 1, 1' are substantially similar except for differences dictated by their respective positions on the truck and may vary considerably in structural details. Each, however, essentially comprises a wheel 2 rotatable on an axle 3 carried in a yoke formed by depending lugs 4 integral with a swivel plate 5. This plate is rotatably secured to a base plate 6, 6', as the case may be, by a bolt 7 and nut 8, while anti-friction bearings 9 are desirably interposed between the swivel and base plates to facilitate the free swivelling movement of the former under the latter.

The base plate 6 of the caster 1 is provided with an extension 12 having a rectangular opening extending through it for a purpose which will hereafter appear, and approximately 90° therefrom, with an outwardly and downwardly depending lug 13 carrying at its lower extremity an integral sleeve 14 in which is slidably received a locking dog 15; one end of this dog is slightly tapered and adapted to enter either of two complementary diametrically opposed notches 16 in the edge of the swivel plate 5. The base plate 6' of the caster 1' is provided with a substantially similar but oppositely disposed lug 13', sleeve 14' and locking dog 15' adapted to enter the notches 16' in the swivel plate 5 of this caster, and also with an extension 12' disposed in alignment with the extension 12 of the caster 1.

The rectangular openings through these extensions 12 and 12' slidably receive a lock actuating rod 20 extending longitudinally of the truck and projecting somewhat beyond its ends, and on this rod the locking dogs 15, 15' are mounted through the medium of offset brackets 22, 22' respectively integral with the dogs and secured to the rod in longitudinally spaced relation by set screws 24. Longitudinal movement of the rod is thus effective to produce corresponding movement of the locking dogs in their sleeves 14, 14' and the dogs are therefore desirably so positioned on the rod that when the rod is at either limit of its travel one locking dog is fully entered in a notch in its adjacent swivel plate and the other is freed entirely from engagement with its adjacent swivel plate, while when the rod is in intermediate position the locking dogs are both disengaged from the truck.

At the opposite ends of the truck, substantially identical means for longitudinally sliding the actuating rod 20 are provided and therefore a description of those at one end will suffice equally for those at the other. Thus secured near each end of the locking rod is a collar 25 provided with an upwardly extending integral fork adapted to loosely receive the lower end of a spring leaf 26 depending from an operating lever 27 which is pivotally supported on a bracket 28 mounted on the end wall of the truck and thus adapted for limited oscillatory movement in a plane parallel to the rod 20. The upper end of this lever is provided with a knob 29 or other convenient hand grip, and means now to be described are provided for yieldingly holding the lever in its neutral or intermediate and in the opposed limit positions of its travel in accordance with the desires of the operator.

To this end, a plate 31 is secured to and projects outwardly from the end of the truck above the bracket 28 and is provided with a vertically extending parti-cylindrical depression or "dwell" 32 formed on substantially the same radius as the section of the operating lever and in substantial vertical alignment with its plane of oscillation and also with generally similar depressions or "dwells" 33, 34 oppositely spaced therefrom and disposed at angles to the vertical corresponding to radii drawn from the pivotal axis and coinciding with the limits of movement of the lever.

The plate 31 is so positioned that when the lever is engaged therewith between the dwells, appreciable lateral pressure is exerted thereon and little or no such pressure when the lever is in any of the dwells. It results that the lever tends to remain in whichever dwell it may be engaged but can be moved therefrom and along the face of the plate by application of sufficient force to overcome the resistance afforded thereby.

A keeper plate 36 is mounted on plate 31 to prevent the lever from being moved or bent too far outwardly by careless handling or otherwise but is so positioned as to afford adequate clearance for free movement of the lever through its normal path of travel.

As previously stated, a lever 27 and associated parts similar to those to which reference has just been made are located at each end of the truck.

In describing the operation of the locking mechanism it will be assumed the parts are initially in the positions shown in Fig. 1 with both operating levers in neutral, i. e. in the vertical dwells 32 of their plates 31, and that the operator is at the left hand end of the truck, viewed as in said figure. With the levers in this position both locking dogs are disengaged from their swivel plates, and the casters 1, 1' are therefore free to swivel in all directions. If the operator now wishes to lock the caster 1' at the opposite end against swivelling and thereby confine its wheel 2 to rotation only in a plane parallel to the sides of the truck, he moves the adjacent i. e., left hand, operating lever 27 from the dwell 32 rearwardly to the dwell 33 and the corresponding movement of its spring leaf 26 in the opposite direction tends to move the lock actuating rod 20 in a like direction, but if, as is frequently the case, and for present purposes will be assumed, the wheel 2 and both of adjacent notches 16' are not aligned with the said plane, dog 15' of caster 1' cannot enter either of these notches but merely engages the periphery of the swivel plate 5 of this caster. The parts are now in the position of Fig. 2 and the caster 1' therefore remains free to swivel until either of the notches 16' in its swivel plate aligns with the locking dog 15' when the latter immediately enters the notch due to the force of the said spring leaf 26 acting against the rod 20 and the resultant movement of the latter simultaneously causes the operating lever 27 at the opposite end of the truck to move to and enter its dwell 33' corresponding to the new position of the locking mechanism as a whole as shown in Fig. 3. Of course, if at the time the operator initially moves the lever as above stated a notch 16' happens to be aligned with the locking dog 15' the dog immediately enters the notch, and the intermediate position of the mechanism as shown in Fig. 2 is omitted.

From the foregoing it will be readily apparent that if the operator wishes to lock the other caster, 1, from the same end of the truck he may readily do so by moving the lever 27 in the opposite direction into the dwell 34, preferably holding it until the dog 15 enters a slot 16, if it does not do so immediately, while, in a corresponding manner either caster may be locked from the opposite end of the truck by means of the lever adjacent that end, and either caster likewise unlocked by suitable reverse movement of either lever in accordance with the will of the operator.

It results that a truck furnished with casters and control means therefor constructed in accordance with my invention may be used as an ordinary swivel truck when the caster locking mechanism is in neutral position and that when desired one caster, which will usually be a front caster corresponding to the direction of travel of the truck, may readily be releasably locked against swivelling and its wheel maintained in a plane parallel to the sides of the truck so as to cause it to "track" in, that is adhere to, the desired path of movement of the latter as determined by the operator and may be as readily unlocked and again allowed to swivel.

Consequently when the truck is to be moved into a narrow space, as when a baker's rack or the like is placed in a proofing oven, in which the clearance about the sides of the truck or rack is usually quite narrow, the operator may readily guide the truck from the rear while moving it into the oven with a front caster locked against swivelling and then, when the truck is to be withdrawn, may unlock that caster and lock one at the opposite and now front end prior to withdrawing the truck from the oven without being required to go into the oven beyond the outer end of the truck at any time, since as above pointed out, the locking of a front caster facilitates movement of the truck along a substantially rectilinear path without occurrence of the frequent erratic departures therefrom which usually take place when all the casters are free to swivel.

Moreover, since the mechanism is so arranged as to render simultaneous locking of both casters impossible, no matter how carelessly it is operated, no more than one caster can ever be locked at the same time and the truck is thus capable of being moved substantially in any direction at all times although when it is desired to move it laterally it is preferable that all the casters be free to swivel as if one of them is locked it may be damaged or may damage the floor. However, as either caster can be locked and unlocked from either end of the truck by a simple movement of either operating lever, the truck may very readily be placed in the preferred condition for either lateral or longitudinal movement.

While I have herein described one embodiment of my invention with considerable particularity, and have referred to certain ways of utilizing a locking mechanism constructed in accordance therewith, it will be understood I do not thereby desire or intend to limit or confine myself thereto in any way as changes and modifications in the form, structure and arrangement of the several parts and their mode of operation will readily occur to those skilled in the art and may be made if desired without departing from the spirit and scope of the invention as defined in the appended claims.

Having thus described my invention, I claim and desire to protect by Letters Patent of the United States:

1. In combination with a truck of the class described, a pair of swivel casters having notched swivel plates, a longitudinally slidable rod, locking dogs carried by the rod respectively adapted to enter the notches in the plates and means for sliding the rod comprising pivoted actuating levers respectively supported adjacent the ends of the truck and yielding means connecting each lever with the adjacent end of the rod whereby when either lever is moved about its pivot in either direction the rod is urged to move in a corresponding direction to thereby move the dogs oppositely with respect to their adjacent swivel plates.

2. In combination with a truck of the class described, a pair of swivel casters, an actuating rod slidably supported therefrom, means carried by the rod respectively adapted to releasably lock the casters against swivelling and means for actuating the rod to selectively lock one caster or the other or to permit both casters to swivel comprising collars respectively secured to the rod adjacent its ends, pivoted actuating levers respectively disposed adjacent the ends of the truck, springs flexible in the direction of movement of the rod respectively forming yielding connections between the levers and collars and means engaging each lever respectively adapted to yieldingly maintain it in predetermined pivotal relations to the truck.

3. In caster locking mechanism for a truck of the class described, a longitudinally slidable actuating rod disposed beneath the truck and projecting beyond the ends thereof, manually movable operating levers pivotally supported adjacent the ends of the truck, a leaf spring interconnecting each lever with the adjacent end of said rod and yieldable longitudinally of the rod and a plate carried by the truck adjacent each lever projecting into the plane of normal pivotal movement thereof and having a plurality of lever receiving grooves disposed in substantial coincidence with said plane and respectively adapted when the lever is entered therein to yieldingly restrain it against pivotal movement.

4. In combination with a truck of the class described, a caster comprising a base plate secured to the bottom of the truck and having a pair of integral projections respectively affording elongated apertures having parallel axes, a notched swivel plate pivotally carried by the base plate, a caster wheel rotatably supported thereon, a dog slidable in the aperture in one of the projections adapted to enter a notch in the swivel plate to thereby restrain its pivotal movement with respect to the base plate, a rod slidable in the aperture in the other projection interconnected with and operable to actuate said dog and means for sliding the rod.

5. In combination with a truck of the class described, a pair of casters each comprising a base plate secured to the truck, a notched swivel plate pivotally secured to the base plate, a rotatable caster wheel carried by the swivel plate and means supported from the base plate operable to enter a notch in the swivel plate to lock it against rotation, a longitudinally slidable rod extending adjacent the casters and interconnected with the notch entering means whereby by moving the rod in either direction one of said means may be caused to enter a notch in the swivel plate of one caster if said notch be aligned with said means, and the other of said means retracted from the swivel plate of the other caster, and manually operable means respectively disposed adjacent the ends of the truck for moving the rod in opposite directions.

6. In caster locking mechanism of the class described, a pair of swivel casters, a longitudinally slidable rod extending adjacent thereto, means carried by the rod selectively operable to releasably lock either caster against swivelling, manually operable levers adapted for pivotal movement substantially in the plane of the rod respectively disposed adjacent each end thereof, spring means extending from each lever toward and loosely connected with the rod operable to yieldingly urge it in opposite directions in correspondence with movements of either actuating lever and to yieldingly urge the other operating lever in corresponding directions in response to movements of the rod.

7. In combination with a truck of the class described, a pair of longitudinally aligned swivel casters having notched swivel plates, an actuating rod extending longitudinally of the truck, locking dogs carried by the rod respectively adapted to enter a notch in one of said plates, a pivoted operating lever disposed adjacent each end of the rod having a spring connection therewith and a plate associated with each lever having a plurality of grooves respectively corresponding to intermediate and limit lever positions, the plate serving to deflect the lever from its normal plane of oscillation when it is moved from one of said grooves to another.

8. In combination with a truck of the class described, a pair of longitudinally aligned swivel casters, an actuating rod extending longitudinally of the truck and axially movable with respect thereto, means carried thereby adapted to selectively releasably lock either caster against swivelling, pivoted operating levers respectively disposed adjacent the ends of the rod operable to move the rod axially to actuate said locking means, means yieldingly connecting the levers with the rod, and means engaging each lever adapted to yieldingly restrain its pivotal movement.

9. In truck caster locking mechanism, a longitudinally slidable rod, a pivoted operating lever disposed adjacent each end of the rod, a leaf spring extending from one end of each lever and loosely interconnected with the adjacent end of the rod, and means respectively engaging the levers adjacent their other ends adapted to yieldingly resist movement of the levers about their pivots.

10. In truck caster locking mechanism, a pair of swivel casters, a slidable rod, means disposed in longitudinally spaced relation on the rod respectively adapted when the rod is in the limit positions of its travel to lock one caster against swivelling and leave the other caster free to swivel, a lever pivoted adjacent each end of the rod, a fork on the rod adjacent each lever, and a leaf spring extending from one end of each lever into said fork and adapted to flex in the plane of oscillation of the lever.

11. In truck caster locking mechanism, a pair of swivel casters, a slidable rod, means disposed in longitudinally spaced relation on the rod respectively adapted when the rod is in the limit positions of its travel to lock one caster against swivelling and leave the other caster free to swivel, a lever pivoted adjacent each end of the rod, a fork on the rod adjacent each lever, a leaf spring extending from one end of each lever into said fork and adapted to flex in the plane of oscillation of the lever, and means tending to yieldingly restrain the levers from oscillation about their respective pivots.

12. In combination with a truck of the class described, a pair of longitudinally aligned swivel casters each having a swivel plate with a notch in its periphery, an actuating rod extending longitudinally of the truck, locking dogs carried by the rod adjacent each caster and respectively adapted to enter a notch in the swivel plate thereof to thereby lock it against rotation, a pivoted operating lever disposed adjacent each end of the truck, and a leaf spring depending from each lever adapted to flex in its plane of oscillation, the free end of the spring forming a loose connection with the adjacent end of the rod, whereby movement of either lever to either of its limit positions is operative to flex its adjacent spring and thereby apply spring pressure to the rod tending to move it in a direction to cause one of the dogs to automatically enter a notch in the adjacent swivel plate whenever the latter comes into alignment with the dog.

13. In combination with a truck of the class described, a pair of longitudinally aligned swivel casters each having a swivel plate with a notch in its periphery, an actuating rod extending longitudinally of the truck, locking dogs carried by the rod adjacent each caster and respectively adapted to enter a notch in the swivel plate thereof to thereby lock it against rotation, a pivoted operating lever disposed adjacent each end of the truck, and a leaf spring depending from each lever adapted to flex in its plane of oscillation, the free end of the spring forming a loose connection with the adjacent end of the rod, whereby movement of either lever to either of its limit positions is operative through its adjacent spring to apply spring pressure to the rod, tending to move it in a direction to cause one of the dogs to engage the swivel plate of one of the casters if its periphery is then aligned with said dog and to cause the dog to automatically enter a notch in said plate whenever it is thereafter brought into alignment therewith.

JAMES BOWEN.